United States Patent
Fullam et al.

(10) Patent No.: US 10,416,333 B2
(45) Date of Patent: Sep. 17, 2019

(54) MAGNETIC TRACKER WITH DUAL-TRANSMIT FREQUENCY

(71) Applicant: Microsoft Technology Licensing, LLC, Redmond, WA (US)

(72) Inventors: Scott F. Fullam, Palo Alto, CA (US); Lev Cherkashin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/600,357

(22) Filed: May 19, 2017

(65) Prior Publication Data
US 2018/0338297 A1   Nov. 22, 2018

(51) Int. Cl.
| | | |
|---|---|---|
| *G01V 3/08* | (2006.01) | |
| *H04W 88/06* | (2009.01) | |
| *H04W 4/02* | (2018.01) | |
| *G02B 27/01* | (2006.01) | |
| *H04W 88/02* | (2009.01) | |
| *H04W 4/029* | (2018.01) | |
| *H04W 4/80* | (2018.01) | |

(52) U.S. Cl.
CPC .......... *G01V 3/081* (2013.01); *G02B 27/017* (2013.01); *H04W 4/023* (2013.01); *H04W 4/026* (2013.01); *H04W 88/06* (2013.01); *G02B 2027/0138* (2013.01); *H04W 4/029* (2018.02); *H04W 4/80* (2018.02); *H04W 88/02* (2013.01)

(58) Field of Classification Search
CPC ....................................................... H04W 4/80
See application file for complete search history.

(56) References Cited

U.S. PATENT DOCUMENTS

| | | |
|---|---|---|
| 6,172,499 B1 | 1/2001 | Ashe |
| 7,015,859 B2 | 3/2006 | Anderson |
| 8,072,220 B2 | 12/2011 | Dolgin et al. |
| 8,121,812 B2 | 2/2012 | Higgins |
| 8,683,707 B1 | 4/2014 | Horton |
| 9,495,801 B2 | 11/2016 | Ebstyne et al. |

(Continued)

FOREIGN PATENT DOCUMENTS

| | | |
|---|---|---|
| EP | 2662755 A1 | 11/2013 |
| JP | 2009047470 A | 3/2009 |

OTHER PUBLICATIONS

"6dof electromagnetic tracker construction howto", https://www.na-mic.org/Wiki/index.php/6DOF_Electromagnetic_Tracker_Construction_HOWTO, Retrieved on: Dec. 27, 2016, 3 pages.

(Continued)

*Primary Examiner* — Hsinchun Liao
(74) *Attorney, Agent, or Firm* — Mike R. Cicero; Newport IP, LLC

(57) ABSTRACT

A system of a transmitter and a receiver uses magnetic fields to determine the relative position and orientation, or pose, of the two devices. For example, the transmitter could be a handheld control device and the receiver could be an augmented reality or other computing solution. The transmitter transmits two magnetic fields of differing frequencies and differing amplitudes. The receiver selects the one of the magnetic fields with the higher signal to noise ratio to determine the relative pose of the transmitter. By using two magnetic fields of different amplitudes, the pose can be determined over a wider range of separations.

12 Claims, 8 Drawing Sheets

(56) References Cited

U.S. PATENT DOCUMENTS

| | | | |
|---|---|---|---|
| 2003/0215125 A1* | 11/2003 | Yokoi | G06F 19/3412 |
| | | | 382/131 |
| 2008/0174500 A1* | 7/2008 | Turner | H01Q 1/273 |
| | | | 343/703 |
| 2009/0096447 A1* | 4/2009 | Prance | G01R 33/323 |
| | | | 324/307 |
| 2010/0045269 A1 | 2/2010 | Lafranchise et al. | |
| 2010/0271012 A1 | 10/2010 | Patterson et al. | |
| 2013/0249784 A1 | 9/2013 | Gustafson et al. | |
| 2013/0303878 A1 | 11/2013 | Nevo et al. | |
| 2015/0308861 A1 | 10/2015 | Jung et al. | |
| 2016/0246369 A1 | 8/2016 | Osman | |

OTHER PUBLICATIONS

Chen, et al., Finexus: Tracking Precise Motions of Multiple Fingertips Using Magnetic Sensing, In Proceedings of the CHI Conference on Human Factors in Computing Systems, May 7, 2016, pp. 1504-1514.

* cited by examiner

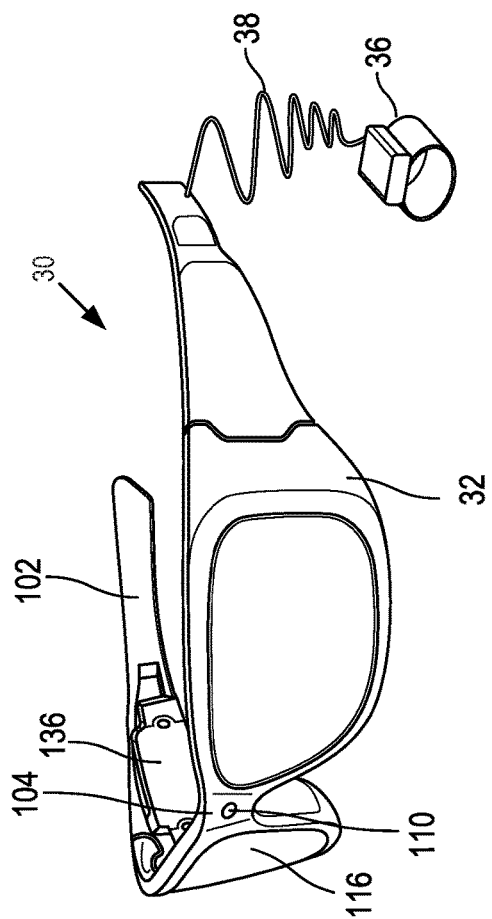
Fig. 1A

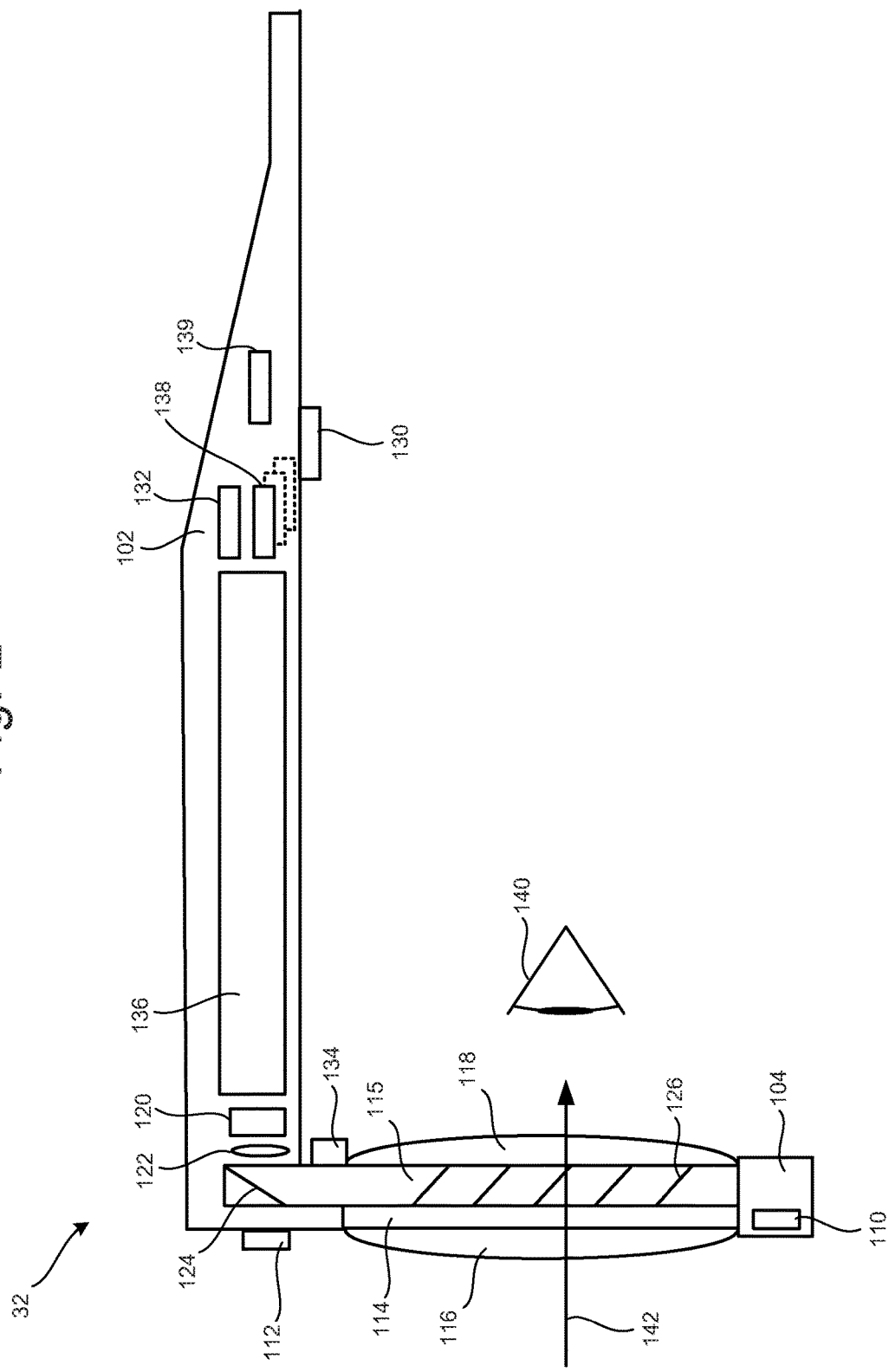

MAGNETIC TRACKER WITH DUAL-TRANSMIT FREQUENCY

BACKGROUND

Many electronic devices, such as wearable, augmented reality computing solutions, video game consoles, smart phones and tablet computers among others, benefit from hand-held input devices for precise and rapid control of the system. These handheld devices can use a magnetic field signal to allow measurement of the relative position and alignment, or pose, of the hand-held device. As the magnetic field falls off with a $1/r^3$ behavior, a magnetic signal of a given power has limited useful range over which can be used without becoming either too weak or so powerful as to saturate the receiving device.

SUMMARY

Embodiments of the present technology relate to a system and method whereby a receiving device can determine the relative position and orientation, or pose, of a transmitting device based on magnetic fields generated by the transmitting device. For example, the receiving device could be an augmented reality (AR) device, such as a head mounted display device, a tablet, smart phone, video gaming console or other computer device and the transmitter could be a hand-held control device. The transmitting device transmits multiple magnetic fields of different frequencies, including a first magnetic field with a higher power level for use at greater separation distances and a second field with a lower power level for use at lesser separations. The receiving device determines which of the magnetic fields has the better signal to noise ratio and uses that field to determine the relative pose between the two devices. If the other of the magnetic fields has a lower, but still acceptable signal to noise ratio, both of the fields can be used to determine the pose.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is illustrates a hand-held transmitter and a mobile processing device including a head mounted display device as a receiver.

FIG. 2 shows a side view of the head mounted display of FIG. 1.

DETAILED DESCRIPTION

Figure 1B:
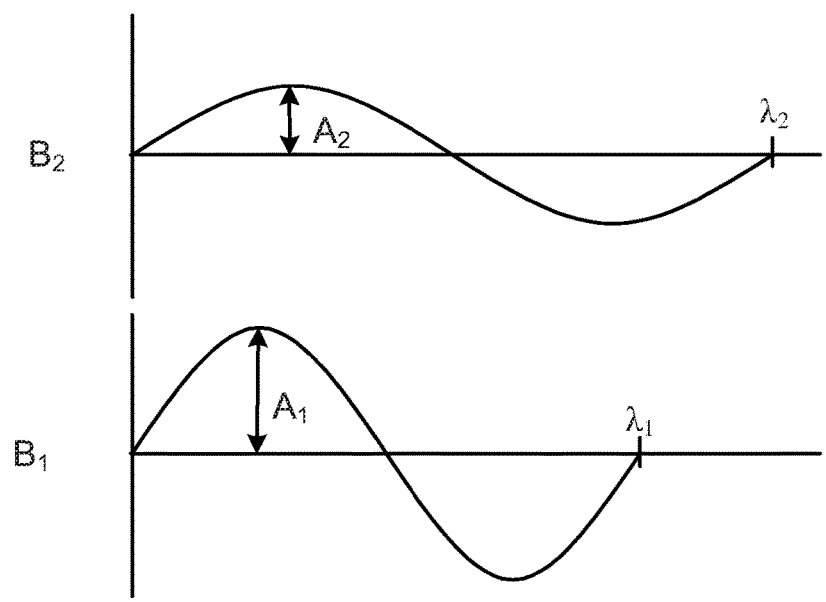
FIG. 1B is a schematic representation of two magnetic fields of different amplitudes and frequencies.

Embodiments of the present technology will now be described with reference to the figures, which in general relate to a system of a transmitting device and receiving device and methods of determining the pose of the transmitting device relative to the receiving device. More specifically, a hand-held other input device transmits magnetic fields that the receiver can use to determine the relative position and orientation, or pose, between two devices (one transmitter and one receiver) in an arrangement that can work with across a wide variety of transmitter/receiver configurations.

Computing devices, such as gaming consoles, wearable augmented reality devices, tablets, and so on, can benefit from hand-held input devices for precise and rapid control. These handheld devices can transmit a magnetic field signal to allow a receiving computing device to measure of the pose of the hand-held device with respect to the computing device. The transmitter/receiver system operates by having one of the devices (usually the handheld device) transmit a plurality of magnetic field signals and having the other side measure the received signals. The pose can then be computed by using the near-field fall-off relationship of magnetic fields and the plurality of signals.

A magnetic tracking systems can use a single frequency for each magnetic element between the transmitter and receiver to measure pose between the two. The use of single frequency can simplify and lower cost of the system, but can complicate the control software and present performance problems. Since the magnetic field falls off with a $1/r^3$ behavior, a magnetic signal of a given power has limited useful range over which it can be used without being either too weak or so powerful as to saturate the receiving device. If the system is to be used outside of this range, a single frequency system requires that the transmitter change transmit power during operation to maintain a sufficient signal to noise ratio in the receiver in order to obtain high quality pose data. When the transmit power level changes, the receive will momentarily loose its location due to the changing level of the received signal being caused by something other than a location change. The power level change can be communicated to the receiver, but the time delay introduced for communications and receive circuit settle time will introduce a time gap during which the pose cannot be measured. To avoid this issue, a system that transmits on two or more frequencies at a corresponding two or more different power levels can be used. The receiver can select the frequency with the best signal to noise ratio without any communications or circuit performance delays, allowing for continuation operation over a wider range of separations.

Although applicable more generally to transmitter/receiver systems, to provide a specific example for this discussion, it will be placed in the context where the transmitter is a hand-held device and the receiver is a mobile processing device including a head mounted display device. FIG. 1A is a high-level representation illustrating a hand-held transmitter 20 and a mobile processing device 30 including a head mounted display device 32.

The transmitter 20 is configured to emit a first magnetic field $B_1(f_1, A_1)$ having a frequency $f_1$ and amplitude $A_1$ and a second magnetic field $B_2(f_2, A_2)$ having a frequency $f_2$ and amplitude $A_2$. The magnetic fields are represented schematically in FIG. 1B, showing the respective amplitudes $A_2$ and $A_1$ and wavelengths $\lambda_2$ and $\lambda_1$. The frequencies $f_1$ ($\sim 1/\lambda_1$) and $f_2$ ($\sim 1/\lambda_2$) will differ, allowing the receiver to differentiate between the fields, and have different amplitudes corresponding to different power levels. The field with the higher power level can be used to determine the relative pose for larger separations and the field with the lower power level can be used for nearer separations. Here $B_1(f_1, A_1)$ is taken as the higher amplitude field. To avoid a gap in coverage, the relative amplitudes of $A_1$ and $A_2$ can be chosen so that there is at least some overlap between the regions where the two fields have an acceptable signal to noise ratio. Within the overlap region, the two fields can optionally be used in conjunction to improve pose determination. Examples of circuitry for generating the magnetic fields is discussed further below with respect to FIG. 5.

The mobile processing device 30 includes a head mounted display device 32 which may include or be in communication with its own processing unit 36, for example via a flexible wire 38. The head mounted display device may alternatively communicate wirelessly with the processing unit 36. In further embodiments, the processing unit 36 may be integrated into the head mounted display device 32. Head mounted display device 32, which in one embodiment is in the shape of glasses, is worn on the head of a user so that the user can see through a display and thereby have an actual direct view of the space in front of the user. More details of the head mounted display device 32 and processing unit 36 are provided below. Receiving circuitry for the magnetic fields can be incorporated into the frame of the head mounted display device. More detail on the receiving circuitry for the magnetic fields is discussed further below with respect to FIG. 6.

Where not incorporated into the head mounted display device 32, the processing unit 36 may be a small, portable device for example worn on the user's wrist or stored within a user's pocket. The processing unit 36 may include hardware components and/or software components to execute applications such as a plant generation and growth application according to embodiments of the present technology explained below. In one embodiment, processing unit 36 may include a processor such as a standardized processor, a specialized processor, a microprocessor, or the like that may execute instructions stored on a processor readable storage device for performing the processes described herein. In embodiments, the processing unit 36 may communicate wirelessly (e.g., WiFi, Bluetooth, infra-red, or other wireless communication means) with one or more remote computing systems. These remote computing systems may include a computer or a remote service provider. In further embodiments, the processing unit 36 may be a mobile phone or other cellular device, or the processing unit may have a wired or wireless connection to a mobile cellular device.

The head mounted display device 32 and processing unit 36 of the mobile processing device 30 may cooperate with each other to present holographic objects 21 to a user in a mixed reality environment 10. The details of the head mounted display device 32 and processing unit 36 which enable the display of holographic plants that grow over time will now be explained with reference to FIGS. 1A-4.

FIGS. 1A and 2 show perspective and side views of the head mounted display device 32. FIG. 2 shows only the right side of head mounted display device 32, including a portion of the device having temple 102 and nose bridge 104. Built into nose bridge 104 is a microphone 110 for recording sounds and transmitting that audio data to processing unit 36, as described below. At the front of head mounted display device 32 is forward-facing video camera 112 that can capture video and still images. Those images are transmitted to processing unit 36, as described below. While a particular configuration is shown, it is understood that the position of the various components and sensors within the head mounted display device 32 may vary.

A portion of the frame of head mounted display device 32 will surround a display (that includes one or more lenses). In order to show the components of head mounted display device 32, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). In one embodiment, see-through lenses 116 and 118 can be replaced by a variable prescription lens. Opacity filter 114 filters out natural light (either on a per pixel basis or uniformly) to enhance the contrast of the virtual imagery. Light-guide optical element 115 channels artificial light to the eye. More details of opacity filter 114 and light-guide optical element 115 are provided below.

Mounted to or inside temple 102 is an image source, which (in one embodiment) includes microdisplay 120 for projecting a holographic image, and lens 122 for directing images from microdisplay 120 into light-guide optical element 115. In one embodiment, lens 122 is a collimating lens.

Control circuits 136 may be provided within the head mounted display device 32 for supporting various components of head mounted display device 32. More details of control circuits 136 are provided below with respect to FIG. 3. Inside or mounted to temple 102 are ear phones 130 and inertial measurement unit 132. In one embodiment shown in FIG. 3, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 32. The IMU 132 may include other inertial sensors in addition to or instead of magnetometer 132A, gyro 132B and accelerometer 132C.

The head mounted display device 32 may further include one or more environmental sensors 138. The environmental sensors may include a temperature sensor, a humidity sensor, an atmospheric pressure sensor, a rain sensor, an air quality sensor and/or an airborne particulate sensor. The configuration of these sensors may be known in the art. It is understood that the environmental sensors 138 may include other or additional sensors for sensing environmental parameters. As explained below, the feedback from the one or more environmental sensors may be used by the processing unit to determine rate of growth of the holographic plants displayed to a user. The magnetic field receiving circuitry 139 can further be included into the head mounted display device, Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 32. Light-guide optical element 115 also allows light from in front of the head mounted display device 32 to be transmitted through light-guide optical element 115 to eye 140, as depicted by arrow 142, thereby allowing the user to have an actual direct view of the space in front of head mounted display device 32 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user.

As different light rays will travel and bounce off the inside of the substrate at different angles, the different rays will hit the various reflecting surfaces 126 at different angles. Therefore, different light rays will be reflected out of the substrate by different ones of the reflecting surfaces. The selection of which light rays will be reflected out of the substrate by which reflecting surface 126 is engineered by selecting an appropriate angle of the reflecting surfaces 126. In one embodiment, each eye will have its own light-guide optical element 115. When the head mounted display device 32 has two light-guide optical elements, each eye can have its own microdisplay 120 that can display the same image in both eyes or different images in the two eyes. In another embodiment, there can be one light-guide optical element which reflects light into both eyes.

Opacity filter 114, which is aligned with light-guide optical element 115, selectively blocks natural light, either uniformly or on a per-pixel basis, from passing through light-guide optical element 115. However, in general, an embodiment of the opacity filter 114 can be a see-through LCD panel, an electrochromic film, or similar device which is capable of serving as an opacity filter. Opacity filter 114 can include a dense grid of pixels, where the light transmissivity of each pixel is individually controllable between minimum and maximum transmissivities. While a transmissivity range of 0-100% is ideal, more limited ranges are also acceptable, such as for example about 50% to 90% per pixel.

Figure 3:
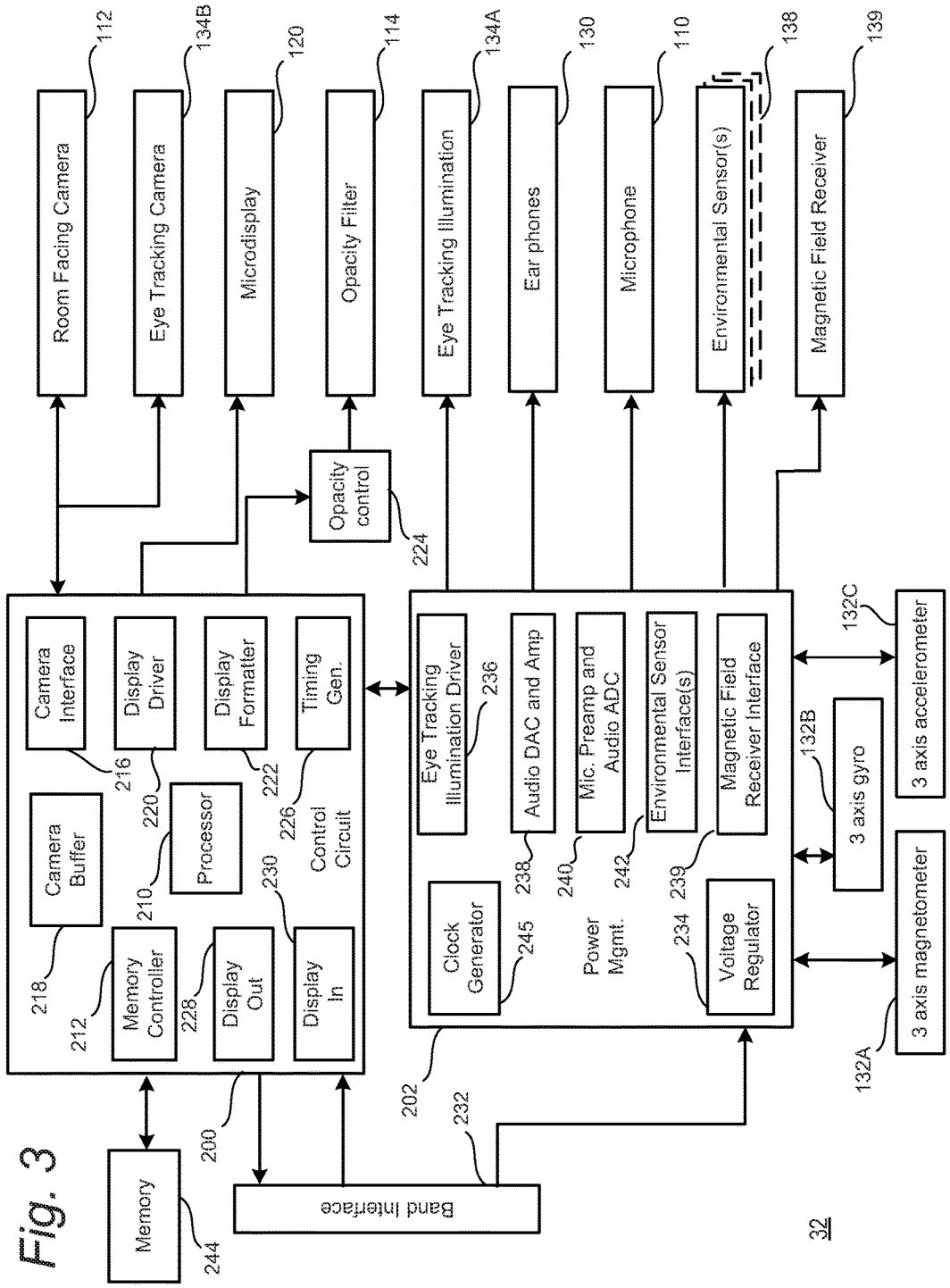
FIG. 3 is a block diagram of one embodiment of the components of a head mounted display unit.

Head mounted display device 32 also includes a system for tracking the position of the user's eyes. The system will track the user's position and orientation so that the system can determine the FOV of the user. However, a human will not perceive everything in front of them. Instead, a user's eyes will be directed at a subset of the environment. Therefore, in one embodiment, the system will include technology for tracking the position of the user's eyes in order to refine the measurement of the FOV of the user. For example, head mounted display device 32 includes eye tracking assembly 134 (FIG. 2), which has an eye tracking illumination device 134A and eye tracking camera 134B (FIG. 3). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

FIG. 2 only shows half of the head mounted display device 32. A full head mounted display device may include another set of see-through lenses, another opacity filter, another light-guide optical element, another microdisplay 120, another lens 122, another forward-facing camera, another eye tracking assembly 134, earphones, and one or more additional environmental sensors.

Figure 4:
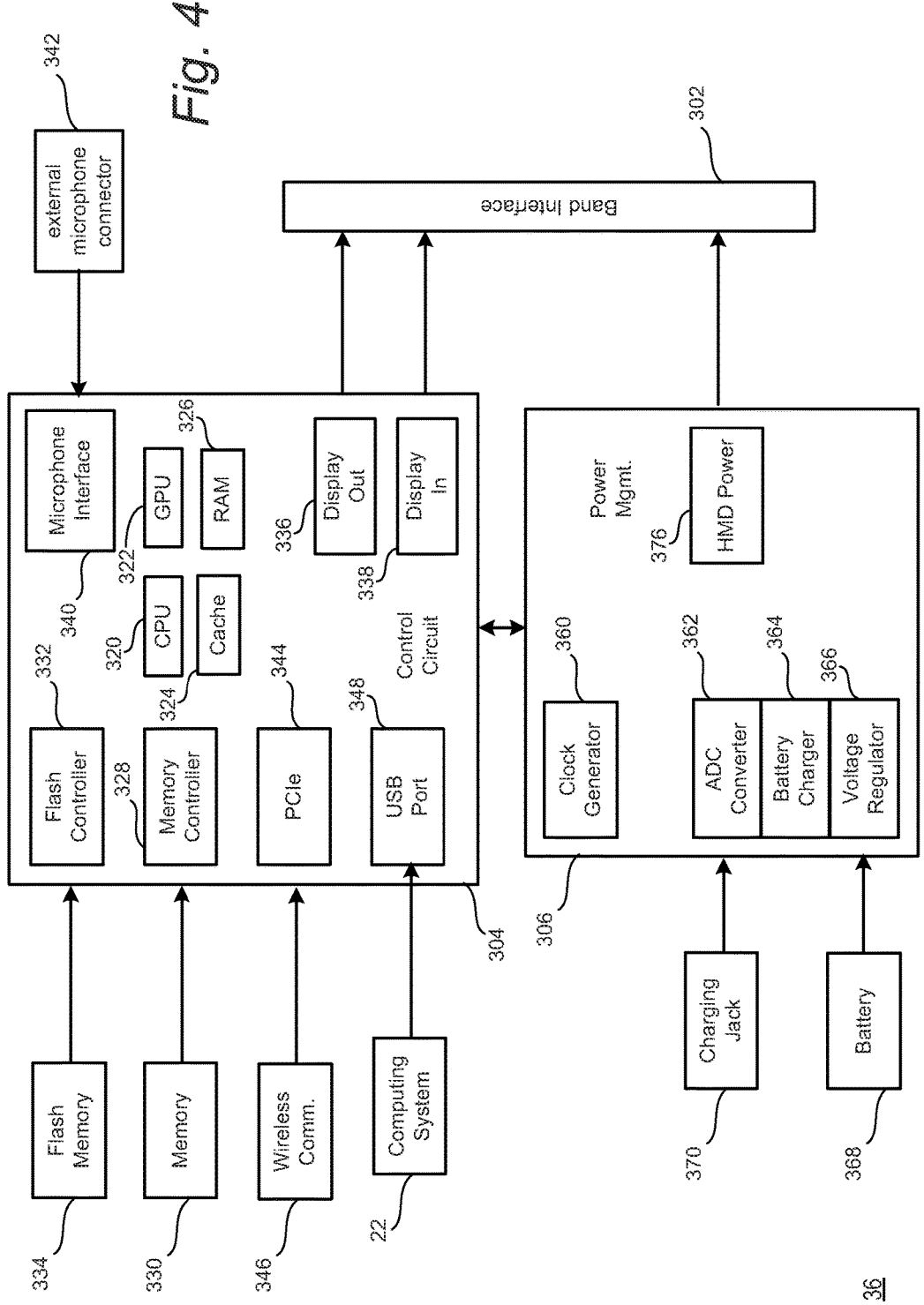
FIG. 4 is a block diagram of one embodiment of the components of a processing unit associated with a head mounted display unit.

FIG. 3 is a block diagram depicting the various components of head mounted display device 32. FIG. 4 is a block diagram describing the various components of processing unit 36. Head mounted display device 32, the components of which are depicted in FIG. 3, is used to provide a virtual experience to the user by fusing one or more virtual images seamlessly with the user's view of the real world. Additionally, the head mounted display device components of FIG. 3 include many sensors that track various conditions. Head mounted display device 32 will receive instructions about the virtual image from processing unit 36 and will provide the sensor information back to processing unit 36. Processing unit 36 may determine where and when to provide a virtual image to the user and send instructions accordingly to the head mounted display device of FIG. 3.

Some of the components of FIG. 3 (e.g., forward-facing camera 112, eye tracking camera 134B, microdisplay 120, opacity filter 114, eye tracking illumination 134A) are shown in shadow to indicate that there may be two of each of those devices, one for the left side and one for the right side of head mounted display device 32. FIG. 3 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, the components of control circuit 200 are in communication with each other via dedicated lines or one or more buses. In another embodiment, the components of control circuit 200 are in communication with processor 210. Camera interface 216 provides an interface to the two forward-facing cameras 112 and stores images received from the forward-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system.

Display out interface 228 is a buffer for providing images from forward-facing cameras 112 to the processing unit 36. Display in interface 230 is a buffer for receiving images such as a virtual image to be displayed on microdisplay 120. Display out interface 228 and display in interface 230 communicate with band interface 232 which is an interface to processing unit 36.

Power management circuit 202 includes voltage regulator 234, eye tracking illumination driver 236, audio DAC and amplifier 238, microphone preamplifier and audio ADC 240, environmental sensor interface(s) 242 and clock generator 245. Voltage regulator 234 receives power from processing unit 36 via band interface 232 and provides that power to the other components of head mounted display device 32. Eye tracking illumination driver 236 provides the IR light source for eye tracking illumination 134A, as described above. Audio DAC and amplifier 238 output audio information to the earphones 130. Microphone preamplifier and audio ADC 240 provide an interface for microphone 110. Environmental sensor interface 242 comprises one or more interfaces adapted to receive input from respective ones of the one or more environmental sensors 138. Power management circuit 202 also provides power and receives data back from three axis magnetometer 132A, three axis gyro 132B and three axis accelerometer 132C.

FIG. 3 also includes the magnetic field receiver 139 to sense the magnetic fields transmitted from the transmitter 20. The receiving circuitry elements will be discussed more with respect to FIG. 6 below. The magnetic field receiver interface 239 is adapted to receive input from the magnetic field receiver 139. The processing unit 36, the processor 210 of head mounted display device 32, or some combination of these can then use the received magnetic field information to determine the relative pose for the receiver, as is also described further below.

FIG. 4 is a block diagram describing the various components of processing unit 36. FIG. 4 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 32 via band interface 302 and band interface 232, display in buffer 338 in communication with head mounted display device 32 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, Bluetooth communication device, infrared communication device, etc. The USB port can be used to dock the processing unit 36 to processing unit computing system 22 in order to load data or software onto processing unit 36, as well as charge processing unit 36. In one embodiment, CPU 320 and GPU 322 are the main workhorses for determining where, when and how to insert virtual three-dimensional objects into the view of the user.

Power management circuit 306 includes clock generator 360, analog to digital converter 362, battery charger 364, voltage regulator 366 and head mounted display power source 376. Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 32. As indicated, the components of the processing unit 36 shown in FIG. 4 may be integrated into the head mounted display device 32 shown in FIG. 3.

Figure 5:
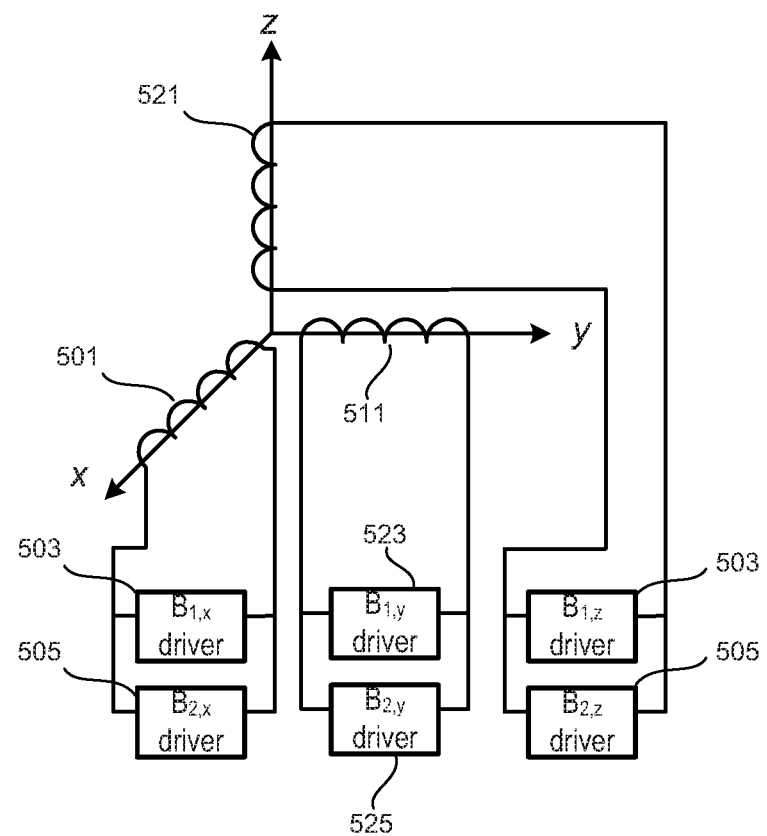
FIG. 5 illustrates some detail of the transmitter for one exemplary embodiment.

FIG. 5 illustrates some detail of the transmitter 20 for one exemplary embodiment. A set of three collocated coils 501, 511, and 521 are oriented along three mutually orthogonal axes, x, y, and z. More generally, the axes need not be orthogonal, but non-degenerate; however, using orthogonal axes makes it simpler to separate out the different directions. The use of three coils on three axes allow for a pose to be determined in three dimensions, but if only two-dimensional information wanted (such where the hand-held controller is used on a surface to, say, produce a drawing for input to a computing device) only two such coils would be needed.

Each of the coils is connected to a driver for each of the two magnetic fields $B_1$ and $B_2$, with drivers $B_{1,x}$ 503 and $B_{2,x}$ 505 drivers connected to the x-axis coil 501, drivers $B_{1,y}$ 513 and $B_{2,y}$ 515 drivers connected to the y-axis coil 511, and drivers $B_1$, 523 and $B_{2,z}$ 525 drivers connected to the z-axis coil 521. Driving the coils with separate frequencies for $B_1$ and $B_2$ allows the receiver to distinguish between the fields and using different amplitudes for each field allows for use over differing ranges of separation. A separate set of coils could be used for each of the fields, but sharing the set of coils reduces the hardware requirements.

Figure 6:
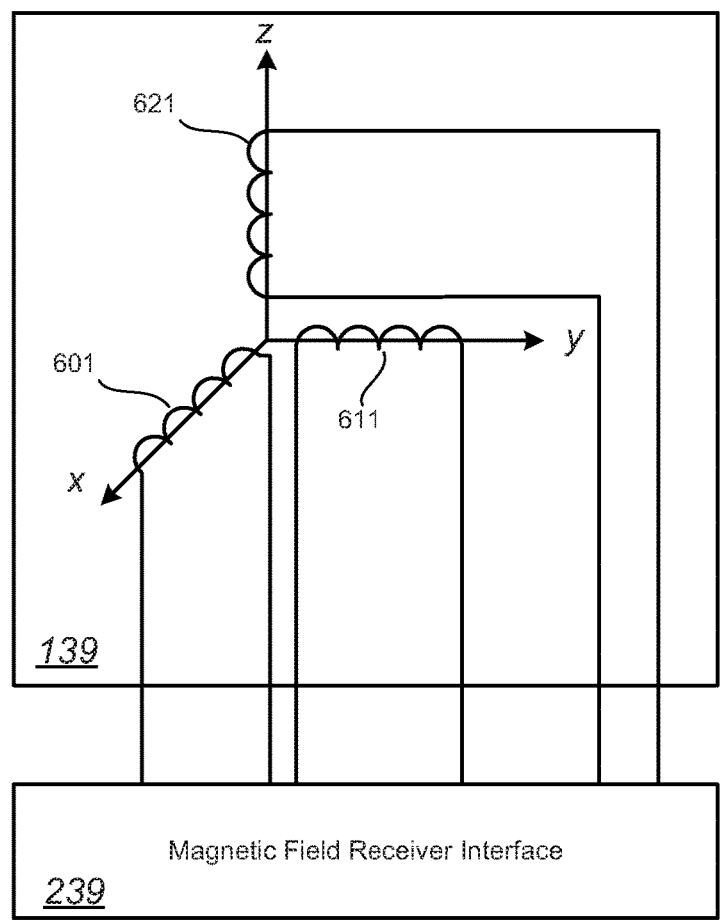
FIG. 6 an embodiment for magnetic field receiving circuitry.

FIG. 6 considers the magnetic field receiving circuitry 139 and magnetic field receiver interface 239 from FIG. 3 further. In the exemplary embodiment of FIG. 6, the magnetic field receiving circuitry 139 uses a set of three collocated coils 601, 611, and 621 are oriented along three mutually orthogonal axes, x, y, and z, similar to the transmitter. As with the transmitter, differing numbers and alignments of the coils can be used, depending on the implementation. The coils 601, 611, and 621 then pass on any received signals to the magnetic field receiver interface 239. The processing unit 36, the processor 210 of head mounted display device 32, or some combination of these can then use the received magnetic field information to determine the pose information. This process can be variously implemented through software or firmware run on the processing devices, hardware elements, or some combination of these.

For each of the magnetic fields, the system determines the signal to noise ratio for the two fields. For instance, if the transmitter is close to the receiver, the signal of the stronger of the two fields may saturate, resulting in low signal to noise ratio so that the weaker field would be used. For a larger separation, the weaker to the two fields will instead have the worse signal to noise ratio, and the stronger field would be used. Over an intermediate range, although one of the fields will have a better signal to noise ratio, the other field may still have sufficiently high signal to noise ratio so that it can also be used to improve the pose determination.

Receivers typically employ automatic gain control, so as to maintain the amplitude of the signals within a manageable ranger for subsequent processing. However, to be able to determine which of the fields has the better signal to noise ratio, that exemplary embodiments do use gain control. If gain control were used, the amplitudes would be flattened out, affecting the determination. Subsequent to the determination, it may sometimes be advantageous to employ some form of gain control to the signals, but not prior to the determination.

Although described above with respect to an embodiment using two magnetic fields, to cover a more extensive range of separations, a larger number of fields can be used. Alternately, while one of the fields is being used for pose determination, the other one of fields not currently in use could change its power level. For example, if the transmitter/receiver is large enough so that the receiving is using the stronger field, the weaker field could be boosted to a still stronger level for use if the (previously stronger) signal being used becomes too weak.

Figure 7:
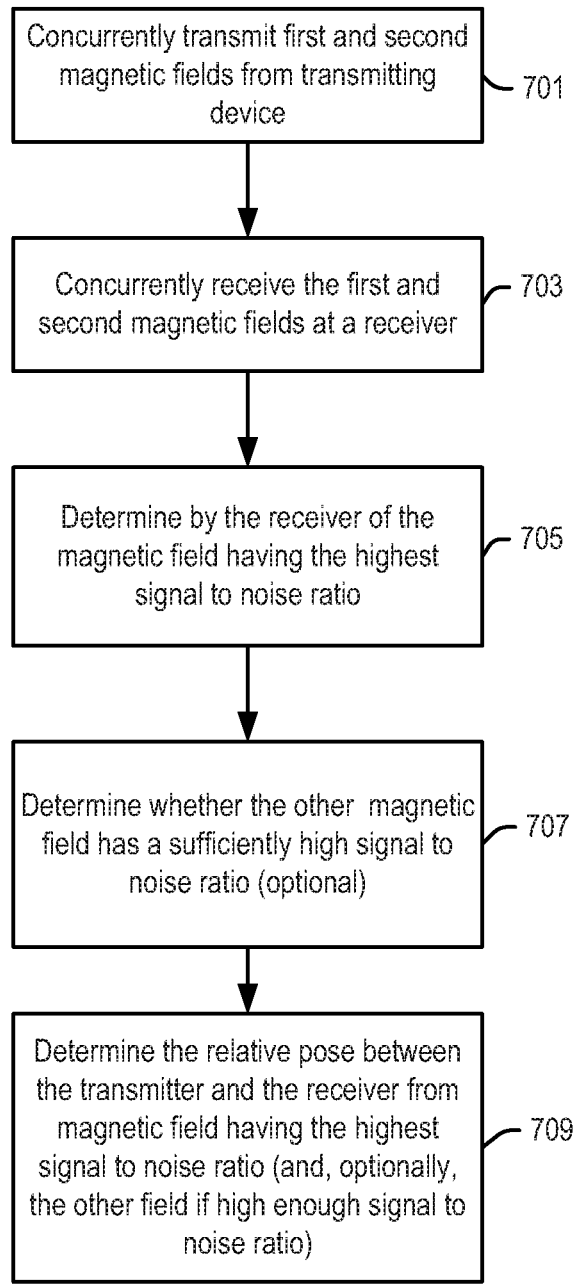
FIG. 7 is a flow chart describing one embodiment of a process for a relative pose determination using the structures of FIGS. 1A-6.

FIG. 7 is a flow chart describing one embodiment of a process for a relative pose determination using the structures of FIGS. 1A-6. Staring at step 701, the transmitter concurrently transmits a first magnetic field and a second magnetic field. The fields use different frequencies and transmit at different power levels. At step 703, the receiver concurrently receives the two magnetic fields. The receiver then determines the signal to noise ratios of the two received fields and determines which has the higher signal to noise ratio at step 705. Optionally, at step 707, the receiver can determine whether signal to noise ratio of the magnetic field with the lower signal to noise ratio is still acceptably high. At step 709, the relative pose between the transmitter and the receiver is determined from the magnetic field with the higher signal to noise ratio. If, at optional step 707, the other magnetic field was found to have an acceptable signal to noise ratio, it can also be used to improve the pose determination.

The preceding discussion was in the context of a transmitter/receiver system where the transmitter is a hand-held control input device and the receiver is a mobile processing device including a head mounted display device that can be used in an augmented reality environment. However, these techniques extend to more general situations where the determination of the relative position, orientation, or both between two objects can be used as a control input or is otherwise useful. For example, the receiving device could be a video game console and the transmitter could be a hand-held or worn input device. The transmitter can also be used as a control device for a smart phone, tablet, or various types of computers, providing pose information in three dimensions or in a two-dimensional implementation where the transmitted is restricted to movement on a surface.

In summary, an example of the present technology relates to a system including a transmitter and a receiver. The transmitter is configured to transmit a first magnetic field signal at a first frequency with a first power level and to concurrently transmit a second magnetic field signal at a second frequency with a second power level. The first power level is greater than the second power level and the first frequency differs from the second frequency. The receiver is configured to concurrently receive the first magnetic field signal and the second magnetic field signal and to determine a one of the first and second magnetic fields that has the higher signal to noise ratio. The receiver is further configured to determine a relative pose between the transmitter and the receiver from the determined one of the first and second magnetic fields.

Another example of the present technology relates to a method. The method includes the concurrent transmission from a transmitter of a first magnetic field at a first frequency with a first power level and a second magnetic field at second frequency with a second power level, wherein the first power level is greater than the second power level and the first frequency differs from the second frequency. The method also includes concurrently receiving the first and second magnetic fields at a receiver. The receiver determines a one of the first and second magnetic fields having the higher signal to noise ratio. The method also includes determining a relative pose between the transmitter and the receiver from the determined one of the first and second magnetic fields.

In a further example, the present technology relates to an apparatus including a receiver. The receiver is configured to concurrently receive a first magnetic field signal of a first frequency and a second magnetic field signal of a second frequency from a transmitter and to determine a one of the first and second magnetic fields having the higher signal to noise ratio. The receiver is also configured to determine a relative pose between the transmitter and the receiver from the determined one of the first and second magnetic fields.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them. A connection includes an electrical connection or a mechanical connection, and can also include two materials in contact For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

We claim:

1. A method, comprising:
    transmitting, from a transmitter, a first magnetic field signal at a first power level while concurrently transmitting a second magnetic field signal at a second power level that is less than the first power level, wherein the first magnetic field signal is transmitted at a first frequency, and wherein the second magnetic field signal is transmitted at a second frequency that differs from the first frequency;
    receiving, at a receiver, the first magnetic field signal while concurrently receiving the second magnetic field signal, wherein:
        the first power level results in the first magnetic field signal having a first useful range over which the first magnetic field signal that is being transmitted from the transmitter does not saturate the receiver, the second power level results in the second magnetic field signal having a second useful range over which the second magnetic field signal that is being transmitted from the transmitter does not saturate the receiver, and the second useful range being closer to the receiver than the first useful range;

determining which particular magnetic field signal, of the first magnetic field signal and the second magnetic field signal, corresponds to a higher signal to noise ratio at the receiver; and determining, while the first magnetic field signal and the second magnetic field signal are being concurrently transmitted, a relative pose between the transmitter and the receiver based on the particular magnetic field signal that corresponds to the higher signal to noise ratio.

2. The method of claim 1, wherein the transmitter includes a first plurality of coils each aligned along one of a first plurality of axes, and wherein transmitting the first magnetic field signal and the second magnetic field signal includes generating the first magnetic field signal and the second magnetic field signal by the first plurality of coils, and wherein the receiver includes a second plurality of coils each aligned along one of a second plurality of axes by which the first magnetic field signal and the second magnetic field signal are received.

3. The method of claim 2, wherein each coil of the first plurality of coils generates both the first magnetic field signal and the second magnetic field signal, and wherein each coil of the second plurality of coils receives both the first magnetic field signal and the second magnetic field signal.

4. The method of claim 2, wherein the first plurality of coils are three coils aligned along orthogonal axes and the second plurality of coils are three coils aligned along orthogonal axes.

5. The method of claim 1, further comprising:

determining, while the first magnetic field signal is being transmitted concurrently with the second magnetic field signal, whether both of the first magnetic field signal and the second magnetic field signal have at least a sufficiently high signal to noise ratio for determining the relative pose; and in response to determining that both of the first magnetic field signal and the second magnetic field signal have at least the sufficiently high signal to noise ratio for determining the relative pose, determining the relative pose between the transmitter and the receiver based on both of the first magnetic field signal and the second magnetic field signal.

6. The method of claim 1, wherein the receiver determines that the particular magnetic field signal has the higher signal to noise ratio without gain control.

7. The method of claim 1, wherein the receiver is a component of an augmented reality device.

8. The method of claim 1, wherein the transmitter is a hand-held device.

9. A method, comprising:

causing a transmitter to transmit a first magnetic field signal at a first power level while concurrently transmitting a second magnetic field signal at a second power level that is less than the first power level, and wherein the first magnetic field signal is transmitted at a first frequency and the second magnetic field is concurrently transmitted at a second frequency that differs from the first frequency;

detecting, via a receiver, the first magnetic field signal concurrently with the second magnetic field signal, wherein:

the first power level results in the first magnetic field signal having a first useful range of distances from the receiver over which the first magnetic field signal does not saturate the receiver, the second power level results in the second magnetic field signal having a second useful range of distances from the receiver over which the second magnetic field signal does not saturate the receiver, and the second useful range being closer to the receiver than the first useful range;

selecting a particular magnetic field signal, from the first magnetic field signal and the second magnetic field signal, based on the particular magnetic field signal having a highest signal to noise ratio of the first magnetic field signal and the second magnetic field signal;

determining a relative pose between the transmitter and the receiver based on the particular magnetic field signal that has the highest signal to noise ratio.

10. The method of claim 9, wherein selecting the particular magnetic field signal includes:

determining a first signal to noise ratio that corresponds to the first magnetic field signal;

determining a second signal to noise ratio that corresponds to the second magnetic field signal; and selecting the particular magnetic field signal based on a comparison between the first signal to noise ratio and the second signal to noise ratio.

11. The method of claim 9, wherein the transmitter is integrated into a hand-held control device that corresponds to a head mounted display device, and wherein the receiver is integrated into the head mounted display device.

12. The method of claim 9, wherein the receiver is integrated into a hand-held control device that corresponds to a head mounted display device, and wherein the transmitter is integrated into the head mounted display device.

* * * * *